Oct. 4, 1960

J. F. MARCH ET AL 2,954,605

GRASS SHEARS

Filed Sept. 24, 1959

INVENTORS
JOSEPH F. MARCH
CHARLES H. KOEPPEL

*Lindsey and Prutzman*
ATTORNEYS

Oct. 4, 1960    J. F. MARCH ET AL    2,954,605
GRASS SHEARS

Filed Sept. 24, 1959                      2 Sheets-Sheet 2

INVENTORS
JOSEPH F. MARCH
BY CHARLES H. KOEPPELL

*Lindsey and Prutzman*
ATTORNEYS

United States Patent Office 2,954,605
Patented Oct. 4, 1960

2,954,605

GRASS SHEARS

Joseph F. March, Waterbury, and Charles H. Koeppel, North Woodbury, Conn., assignors to The Stanley Works, New Britain, Conn., a corporation of Connecticut Filed Sept. 24, 1959, Ser. No. 842,049

6 Claims. (Cl. 30—248)

The present invention relates to grass shears and is concerned more particularly with an improvement in grass shears of the type having a fixed blade and a single movable blade, the movable blade being actuated by a handle mounted pivotally with respect to the handle of the fixed blade.

The aim of the present invention is to provide an improved grass shears of the type referred to having an enhanced cutting action so as to provide positive, clean cutting even with relatively tough wiry grasses. Included in this aim is the provision of improved supporting and mounting means for the movable blade affording an improved cutting relationship and operation effective at all points of engagement of the blades and avoiding wedging of the cuttings between the blades or flip-flap of the blades.

A more specific aim is to provide blade supporting and operating means which will apply a desired pressure on the blades throughout the cutting operation and maintain the cutting edges of the blades in optimum cutting contact in all cutting positions, with the movable blade tilted at an angle to the fixed blade and so arranged that under cutting strain occurring at any point in the cutting operation the tilt of the blade will tend to increase and at the same time a slicing action will occur, thus further improving the cutting action.

Included in the foregoing aims is the provision of a grass shears which is easy and comfortable to operate with a minimum of effort and fatigue.

A further aim is to provide such a grass shears which is of rugged construction and will operate effectively and efficiently over long periods of time without requiring repair or replacement and at the same time is simple and economical to fabricate and assemble.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
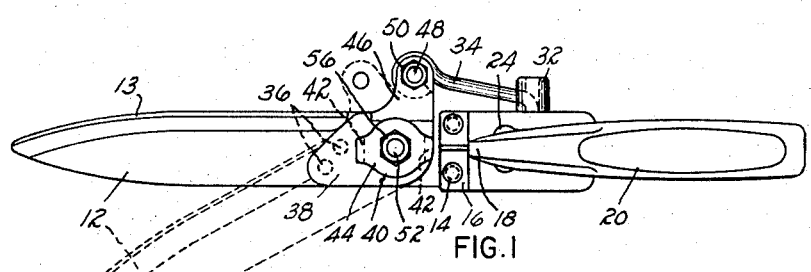
Fig. 1 is a plan view of a grass shears embodying the present invention with the blades in closed position and showing the open position of the top blade in dotted lines.
Figure 2:
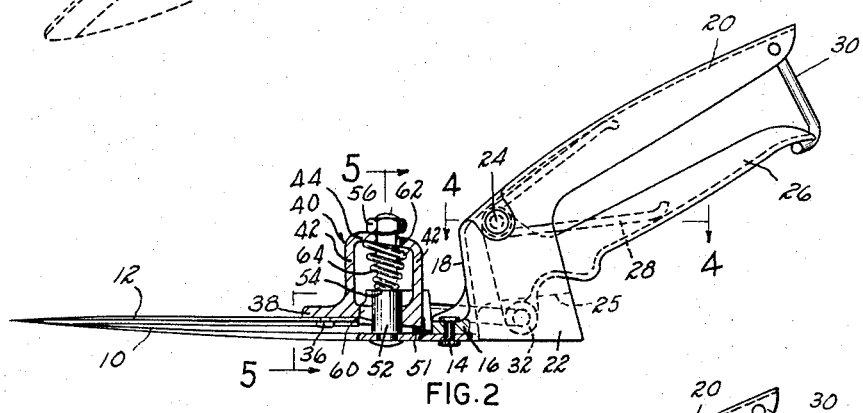
Fig. 2 is a side view of the grass shears with the blades in closed position, the mounting arrangement for the blades being shown partially in cross section.

Referring to the embodiment of the invention shown in the drawings, the grass shears comprises a lower or fixed cutting blade 10 and a movable or upper cutting blade 12. The fixed or lower cutting blade 10 is secured, such as by means of the rivets 14, to a lower extension or foot 16 on the downwardly depending portion 18 of channel-shaped fixed or upper handle 20. The downwardly depending portion 18 is formed with skirts 22, 23 on opposite sides thereof which serve as a decorative and protective reinforcement and also form a support for a transverse pivot pin 24 which pivotally mounts the lower or movable handle 26. The handle 26 also is channel shaped and is contoured to form a comfortable grip for the user. The handles are biased apart to the open position shown in Fig. 3 by the spring 28 extending about the pin 24 and having its ends in engagement with the inner surfaces of the handles. A bail 30 pivotally mounted on the outer end of the handle 20 may be used conveniently to engage the outer lip of the lower handle 26 to retain the same in closed position as shown in Fig. 2. The lower movable handle 26 has an arm 32 projecting outwardly from the side thereof which is accommodated by a notch 25 in the skirt 23 and which is pivotally connected at its outer end to a connecting link 34 which actuates the upper or movable cutting blade 12 in the manner to be described.

The rear end of the upper or movable cutting blade 12 is secured, such as by means of the rivets 36, to the underside of a ledge or base 38 extending forwardly from a blade supporting hinge member or frame 40. The frame 40 comprises in addition to the ledge or base 38, two integrally formed, vertically extending, spaced apart uprights 42 interconnected at the top by the bridge portion or web 44. An integral laterally extending arm 46 on the ledge or base 38 which is offset slightly above the plane of the ledge or base 38 is connected at its outer end to the connecting link 34 by the screw 48 which is retained by the nut 50. A ledge 51 on the underside of the frame 40 for engaging the foot 16 of handle 20 forms a stop limiting pivoting movement of the blade 12 in a closing direction.

The frame 40 is mounted or suspended from a vertically extending post or stud 52 which is fixedly secured at its lower end to the lower cutting blade 10. The upper portion of the stud 52 is reduced in diameter forming an annular shoulder 54 at approximately the midpoint thereof. The upper end of the stud is threaded to receive the holding and adjusting nut 56. The ledge or base 38 of the frame has a center aperture or hole 60 accommodating the stud 52 which is considerably larger in diameter than the largest diameter of the stud 52. In the specific embodiment shown in the drawings, the diameter of the hole 60 is approximately twice that of the base of the stud 52. The upper web or bridge 44 also is provided with a center hole or aperture 62 through which the upper portion of the stud 52 extends and which is slightly larger in diameter than the reduced portion of the stud 52 so that it fits loosely and thereby permits tilting of the frame without binding. The frame is supported on and biased upwardly by a conical spring 64 which seats at its lower end on the shoulder 54 and which bears at its upper end against the web or bridge 44. The holding and adjusting nut 56 bearing against the upper side of the web or bridge 44 retains the parts in assembled relationship and when adjusted determines the maximum elevated position of the frame 40. Neither the base of the frame nor the heel of the movable blade 12 bears against the upper surface of the fixed blade 10 and hence no heel plate is required as is customary in conventional designs to provide cutting pressures and canting motion of the blade.

Figure 3:
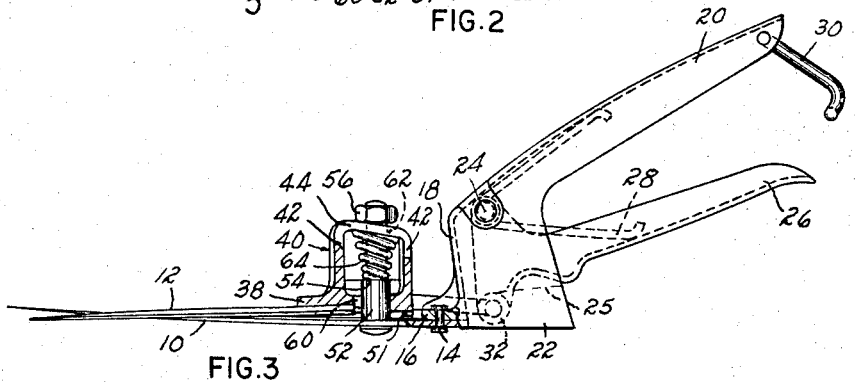
Fig. 3 is a view similar to Fig. 2 with the blades in open position.
Figure 4:
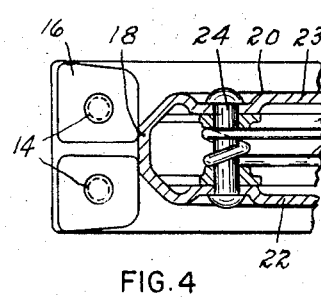
Fig. 4 is a fragmentary cross-sectional view taken along the line 4—4 of Fig. 2.

The web or bridge 44 of the frame 40 is inclined at a small angle rearwardly and downwardly from the front upright 42 with the result that the nut 56 has only a small surface contact therewith. This not only minimizes friction between the nut 56 and frame 40 which reduces the effort required to pivot the frame 40 and its blade 12 but it also provides a fulcrum for the frame which is disposed forwardly of the centerline of the post or stud 52 as best shown in Figs. 2 and 3 of the drawing. Consequently, when the nut 56 is turned down to bring the cutting edges of the blades into engagement with each other, the frame 40 will tilt in a clockwise direction as viewed in Figs. 2 and 3 bringing the rear edge of the hole 60 which forms an arcuate-bearing surface into bearing engagement or abutment with the rear surface of the post or stud 52. At the same time the spring 64 is compressed so that it provides a restoring force tending to pivot the frame in the opposite direction and maintaining a constant pressure on the blades. The use of a conically shaped spring 64 for this purpose assures optimum flexibility and thus a more sensitive action.

Figure 5:
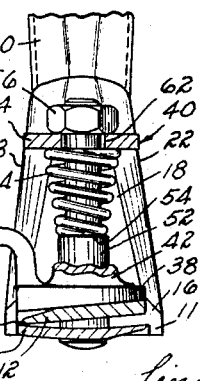
Fig. 5 is a fragmentary cross-sectional view taken along the line 5—5 of Fig. 2.
Figure 8:
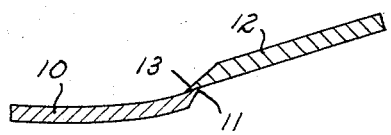
Fig. 8 is a diagrammatic view showing the blades in transverse cross section and disposed in cutting position.

Also, as best shown in Figs. 2, 3 and 5, the lower surface of the ledge 38 to which the upper blade is attached is inclined downwardly to the left as viewed in Fig. 5 and downwardly and forwardly of the blade as shown in Figs. 2 and 3 with the result that the blade 12 is canted toward the blade 10 and also is tilted forwardly and downwardly toward the blade 10. The upper or movable blade 12 is generally flat and planar throughout and is provided with a beveled cutting edge 13 for engagement with the cutting edge of the blade 10. The lower or fixed cutting blade 10 is not planar but is curved longitudinally as best shown in Figs. 2 and 3 and also is curved transversely about an axis parallel to the beveled cutting edge 11. The result is that the upper surface of the blade is concave in both dimensions and has a twist imparted thereto causing the cutting edge 11 to be provided with a gradual but continuous rise from the heel to the point of the blade, thus assuring contact of the blades at all times at the point where the cutting edges intersect to provide a positive cutting action and also to provide a desirable clearance between the blades rearwardly of the cut. The normal disposition of the blades during a cutting operation is illustrated in cross section in Fig. 8 of the drawings.

Figure 6:
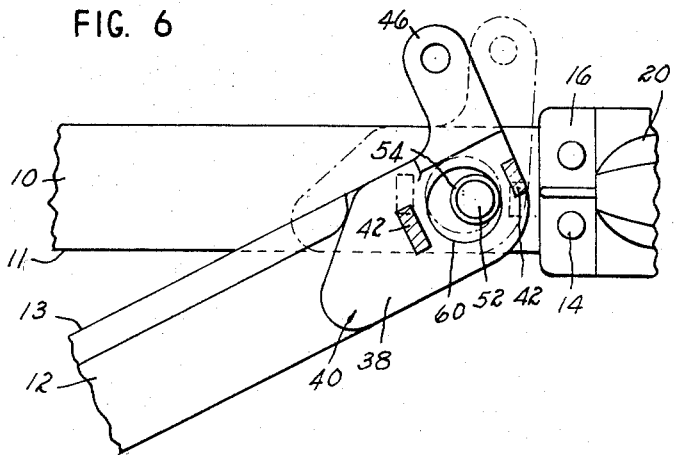
Fig. 6 is a fragmentary diagrammatic view showing the normal relationship of the blades.
Figure 7:
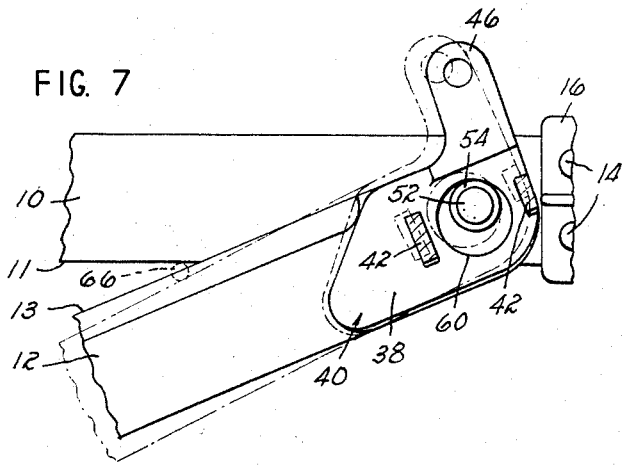
Fig. 7 is a view similar to Fig. 6 illustrating the movement of the blades during a cutting operation.

The improved operation of the grass shears as a result of the novel mounting of the blades above described can be best seen from an inspection of the diagrammatic views of Figs. 6 and 7. Referring first to Fig. 6 of the drawings, the disposition of the blades 10 and 12 in the starting or open position is shown in solid lines in which position the rear edge of the hole 60 in approximate alignment with the centerline of the blade bears against the back of the post or stud 52. In the closed position shown in dotted lines the same relationship is maintained which is to say that the rear edge of the hole 60 in approximated alignment with the centerline of blade 12 has merely rolled around the post or stud 52 maintaining engagement with the rear of the post 52 opposite from the point of the blade 12.

The action of the mechanism during a cutting operation which is particularly manifest when the blades encounter an obstruction such as material difficult to cut as indicated by the dotted circle 66 in Fig. 7, is such that a compound pivoting and slicing action takes place as indicated in Fig. 7 which greatly enhances the cutting action and reduces the effort required to sever the obstruction. As illustrated in Fig. 7 of the drawings, the blade 12 is initially in the dotted-line position. When the blade 12 engages the obstruction 66, the normal swinging movement of the blade is momentarily diminished but the continued rearward pressure on the end of the arm 46, draws the frame 40 and blade 12 rearwardly and laterally to the position shown in solid lines. This entails a double or compound movement which increases the cant of the blade 12 relative to blade 10 and also draws it rearwardly of blade 12 in a slicing action. Since the arm 46 is located close to the plane of the blade 12 and well below the web or bridge 44 from which the frame 40 is suspended, a component of the force applied to the arm 46 will cant the frame 40 transversely of the blade 10 so as to move the bearing surface of the edge of hole 60 toward the side thereof adjacent the arm 46. This also causes the frame and blade to be cammed rearwardly which is further aided by the rearward component of force applied to the arm 46. As a result, the frame 40 and blade 12 move to the solid-line position shown in Fig. 7 which has the effect of increasing the cant or bite of the blade 12 relative to blade 10 thus overcoming any tendency of the blades to spring apart and at the same time producing a desirable slicing action and draw-in as the blade 12 moves rearwardly longitudinally with respect to blade 10. An advantage of the construction of the present invention is that this combined canting and slicing action will occur at any point of engagement between the blades including the extreme ends thereof. The result is that an effective cutting action is provided throughout the entire range of movement of the blades. Even very tough materials such as small branches or twigs can be cut and the effort or force required by the operator is materially reduced.

As a result of the improved construction and operation described, there is provided a grass shears which is easy to operate with minimum effort or fatigue and which is effective and positive in action under conditions of normal usage. The shears are rugged and durable in design and at the same time simple and economical to fabricate and assemble. Variations and modifications of the specific embodiment of the invention within the skill of the art are intended to be included within the scope of the invention.

We claim:

1. In a grass shears, a fixed blade having a handle secured to one end thereof, a stud fixed to said one end of the fixed blade and extending upwardly from the upper surface thereof, a hinge frame mounted on the stud for swinging movement about the stud and also for tilting movement relative to the axis of the stud, the base of the frame having an arcuate bearing surface for engagement with the rear of the stud, retaining means on the upper end of the stud engaging the top of the frame, a spring biasing the frame toward the retaining means, a movable blade fixed to the base of the frame for swinging and tilting movement therewith, an arm extending laterally from the base of the frame, and a movable handle connected to said arm.

2. In a grass shears, a fixed blade having a handle secured to one end thereof, a stud fixed to said one end of the fixed blade and extending upwardly from the upper surface thereof, a frame positioned on the stud having a base and an upper web, said web being provided with an aperture receiving the stud and permitting the web to pivot relative to the stud, said base having an aperture permitting the base to swing radially of the stud and forming an arcuate-bearing surface for engagement with the rear of the stud, a retainer on the upper end of the stud engaging the top of the web, a spring between the stud and web biasing the frame toward the retainer, a movable blade fixed to the base of the frame for swinging and tilting movement therewith, an arm on the base extending laterally of the blade, a movable handle mounted for movement relative to the handle of the fixed blade, and a connecting link between the movable handle and said arm.

3. In a grass shears, a fixed blade having a handle secured to one end thereof, a stud fixed to said one end of the blade and extending upwardly from the upper surface thereof, a frame positioned on the stud for swinging and tilting movement, said frame having a base and an upper web, the web being provided with an aperture accommodating the stud and dimensioned to permit pivoting movement of the web, the base also having an aperture accommodating the stud and materially larger than the stud to permit limited movement of the base radially of the stud, the edge of the aperture forming a bearing surface for engagement with the stud, a retainer on the upper end of the stud engaging the top of the web, a spring between the stud and web biasing the frame toward the retainer, a movable blade fixed to the base of the frame for swinging and tilting movement therewith, said web being inclined rearwardly and downwardly relative to the longitudinal axis of the movable blade, an arm on the base extending laterally relative to the longitudinal axis of the movable blade, a movable handle mounted for pivoting movement relative to the handle of the fixed blade, and a connecting member between the movable handle and the arm on the base.

4. In the grass shears set forth in claim 3, a forwardly extending projection on the base of the frame to which the movable blade is attached, said projection being inclined laterally and forwardly and downwardly of the frame to support the movable blade in canted relationship with respect to the fixed blade and also tilted forwardly and downwardly with respect thereto.

5. In a grass shears, a fixed blade having a handle secured to one end thereof, a stud fixed to said one end of the blade and extending upwardly from the upper surface thereof, said stud having a lower portion of larger diameter and an upper portion of reduced diameter forming a shoulder therebetween, a frame positioned on the stud for swinging and tilting movement, said frame having a base and an upper web connected thereto by spaced uprights, the web being provided with an aperture receiving the upper portion of the stud and permitting pivoting movement of the web relative to the stud, the base having an aperture receiving the lower portion of the stud and materially larger than the stud to permit movement of the base radially of the stud, the edge of the aperture forming an arcuate-bearing surface for engagement with the rear of the stud, a nut threadably engaged on the upper end of the stud and bearing against the top of the web, a conical spring between the web and said shoulder of the stud, a movable blade fixed to the base of the frame for swinging and tilting movement therewith, said web being inclined rearwardly and downwardly relative to the longitudinal axis of the movable blade, an arm on the base extending laterally relative to the longitudinal axis of the movable blade, a movable handle mounted for pivoting movement relative to the handle of the fixed blade, and a connecting rod between the movable handle and the arm on the base.

6. In a grass shears, a fixed blade having a handle secured to one end thereof, said blade having an upper surface curved concavely both laterally and longitudinally thereof to provide a continuously rising cutting edge along one side thereof, a stud fixed to said one end of the blade and extending upwardly from said upper surface, said stud having an upper end of reduced diameter forming a shoulder intermediate the ends of the stud, a frame positioned on the stud for swinging and tilting movement, said frame comprising a base, a pair of spaced apart uprights and an upper connecting web therebetween, said web having an aperture slightly larger than the upper portion of the stud through which the upper portion of the stud extends and said base having an aperture materially larger than the lower portion of the stud through which the lower portion of the stud extends and forming an arcuate-bearing surface for engagement with the lower portion of the stud, a conical spring having its smaller end seated on said shoulder and having its larger end seated against the web, an adjustable nut on the upper end of the stud engaging the top of the web, a generally planar movable blade connected to the base of the frame having a cutting edge along one side thereof engaging the cutting edge of the fixed blade, said movable blade being mounted on the frame in canted and forwardly and downwardly tilted relationship to the fixed blade, said web being inclined downwardly and rearwardly relative to the longitudinal axis of the movable blade, an arm on the base extending laterally relative to the longitudinal axis of the movable blade on the side opposite from the cutting edge thereof, a movable handle pivotally mounted on the handle of the fixed blade, and a connecting link between the arm and the movable handle.

References Cited in the file of this patent

UNITED STATES PATENTS

| | | |
|---|---|---|
| 2,281,977 | Keiser | May 5, 1942 |
| 2,607,114 | Keiser | Aug. 19, 1952 |
| 2,679,096 | Wallace | May 25, 1954 |
| 2,923,058 | Binkley | Feb. 2, 1960 |